UNITED STATES PATENT OFFICE.

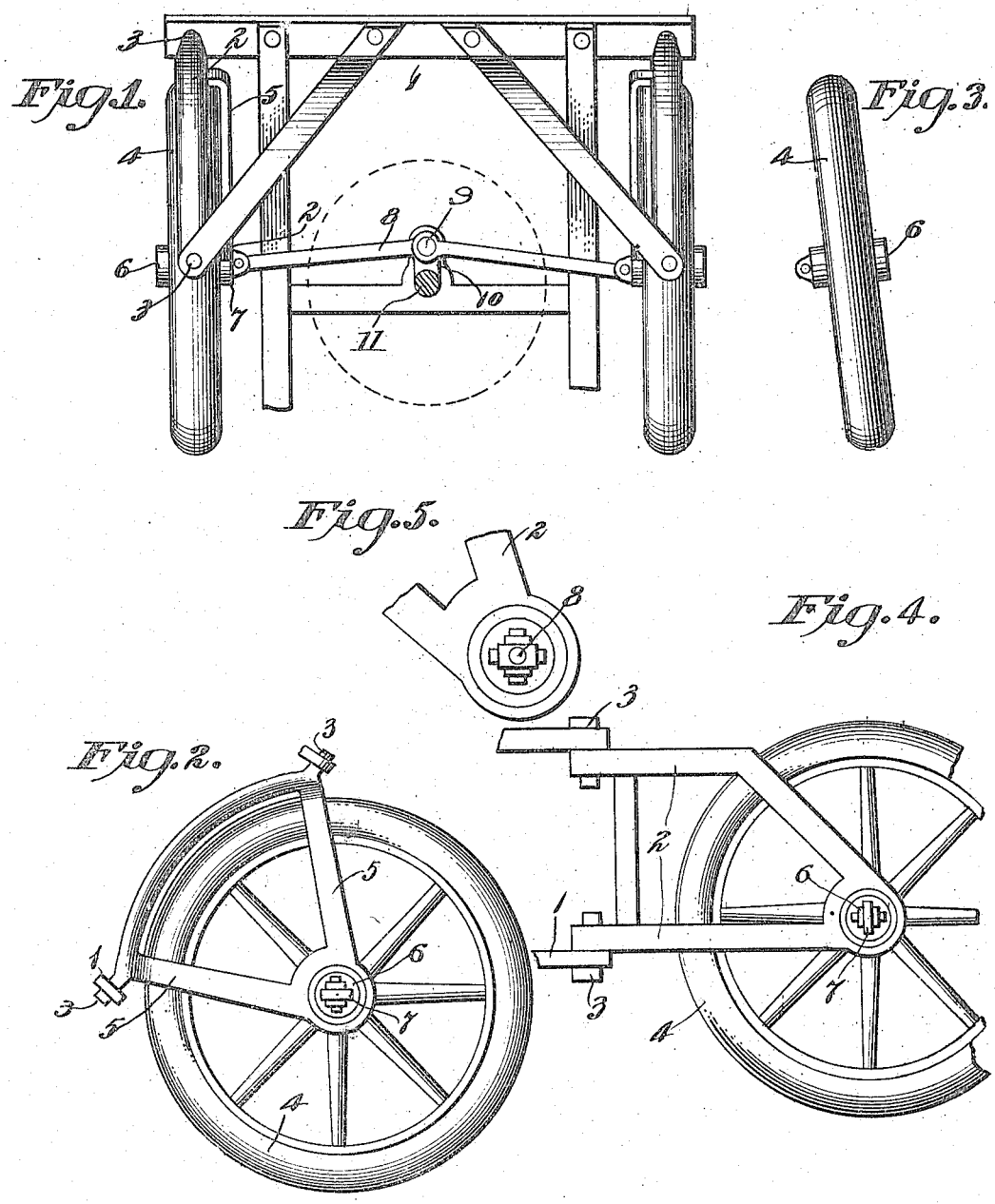

WESLEY WEBBER, OF KEARNEY, NEW JERSEY.

AUTOMOBILE.

1,133,345.  Specification of Letters Patent.  Patented Mar. 30, 1915.

Application filed April 23, 1914. Serial No. 833,920½.

*To all whom it may concern:*

Be it known that I, WESLEY WEBBER, a citizen of the United States, residing at Kearney, in the county of Hudson and State of New Jersey, have invented certain new and useful Improvements in Automobiles, of which the following is a specification.

The object of my invention is, an improvement in the steering gear of an automobile or other vehicle and is accomplished by placing the steering fulcrums outside of, and in front of the center of the periphery of the wheels, thus leading the latter, and preventing the snubbing and skidding of the rear wheels in the act of steering; preventing accidents upon the breaking of the pitman, which are fatal to both the automobile and occupants.

Figure 1 is a plan. Fig. 2 is an upright side view of the wheel. Fig. 3 is an end view of the wheel in the act of steering. Fig. 4 is an alternative. Fig. 5 is a detail of the pitman connection.

Referring to Fig. 1—"1" is a chassis or platform sustaining the mechanism and running gear of an automobile; "2"—"2" are swinging brackets fixed to the chassis "1" and are fulcrumed at "3"—"3" preferably in line of the center of the wheel "4" and outside the periphery thereof. An offset "5"—"5" of said brackets extends along the side and past the center of said wheel "4"; and serves to hold axle "6", which extends through the hub "7" of the wheel "4", the latter revolving thereon. The reverse end of axle "6" extends through swinging bracket "2" and is rigidly fixed thereto supporting said axle "6".

Pitmen or connecting rods "8" are pivotally connected to swinging brackets "9" or to said axle "6", the other ends of said pitmen or connecting rods are pivotally connected to a wrist "9", the latter being fixed to a lever "10" which is fixed to a steering shaft "11", carrying a hand or steering wheel (shown by dotted lines).

It will be observed that, should one of the pitmen or connecting rods "8" break, steering could be accomplished with one wheel without accident, as the loose wheel would trail.

In the act of steering, the pitmen or connecting rods "8," acted on by the steering mechanism, turn the wheels in the desired direction; the wheels "4" "4" (see Fig. 3.) assume the position (relative to the surface traveled) as shown at Fig. 3.

Claims.—

1. In an automobile steering device; wheel carrying brackets each pivoted to parts of the chassis extending from sides thereof, at two points in the wheel plane, one of the points being in front of, and the other above the wheel, so that the axis of the pivots extends upwardly and rearwardly and the wheel will lean in turning; a steering shaft and means operatively connecting the steering shaft and the said wheel carrying brackets.

2. In an automobile; a frame supported on wheel carrying brackets, each of said brackets pivoted to the frame in advance of the wheel axis; a steering shaft carried by said frame and pitmen operatively connecting said steering shaft with said brackets, substantially as described.

In testimony whereof I affix my signature in presence of two witnesses.

WESLEY WEBBER.

Witnesses:
GEORGE W. ASH,
JOSEPH J. CAREY.